Patented June 2, 1953

2,640,785

UNITED STATES PATENT OFFICE 2,640,785

STABILIZED CELLULOSE ESTER COMPOSITIONS

John Kenneth Craver, Webster Groves, Mo., assignor to Monsanto Chemical Company, St. Louis, Mo., a corporation of Delaware No Drawing. Application October 20, 1949, Serial No. 122,600

10 Claims. (Cl. 106—189)

This invention relates to new compositions of matter comprising cellulose derivatives such as cellulose nitrate and cellulose esters of lower fatty acids, a plasticizer therefor and a compound selected from the group consisting of alpha-phenyl-2-ethylcyclohexanol and alpha-cyclohexyl-2-ethylcyclohexanol.

It is an object of this invention to provide light-resistant and weather-resistant plastic compositions.

It is a further object of this invention to provide improved compositions of matter comprising a cellulose derivative such as a cellulose ester or cellulose nitrate, a suitable plasticizer therefor and α-phenyl-2-ethylcyclohexanol or α-cyclohexyl-2-ethylcyclohexanol.

Other objects will become apparent from the specification and examples which follow.

According to the present invention, generally stated, compositions comprising a cellulose derivative such as a cellulose ester, for example cellulose acetate or cellulose acetate butyrate, or cellulose nitrate, a suitable plasticizer such as dibutyl phthalate, diethyl phthalate, triphenyl phosphate, tricresyl phosphate or dibutyl sebacate and α-phenyl-2-ethylcyclohexanol or α-cyclohexyl-2-ethylcyclohexanol have been found to possess very useful properties. Outstanding among the valuable characteristics of these new compositions is their resistance to ultra-violet rays and to outdoor exposure. In these respects these new compositions are greatly superior to compositions comprising cellulose acetate, cellulose acetate-butyrate or cellulose nitrate plasticized with a suitable plasticizer or similar compositions containing in addition thereto a small portion of phenyl salicylate, which is used in the art as an ultra-violet light stabilizer.

In preparing the new compositions of the present invention, a cellulose ester such as cellulose acetate or cellulose acetate butyrate is blended with a suitable plasticizer, such as diethyl phthalate, dibutyl sebacate, triphenyl phosphate, dibutyl phthalate or tricresyl phosphate in the presence of α-phenyl-2-ethylcyclohexanol or α-cyclohexyl-2-ethylcyclohexanol by any suitable means. Thus for example, the components may be dissolved in a suitable solvent, for example, acetone, and cast from the solution as films. The components may also be blended on hot rolls, for example at 80°–100° C. in the presence of sufficient solvent to facilitate blending, the solvent being removed by evaporation on the rolls. The plastic mass thus obtained may then be molded as a sheet by means of a hydraulic press at suitable temperatures, for example 100°–120° C.

My invention may also be practiced with cellulose nitrate using any suitable plasticizer, for example dibutyl phthalate or tricresyl phosphate and incorporating either α-phenyl-2-ethylcyclohexanol or α-cyclohexyl-2-ethylcyclohexanol. Any desired procedure may be employed for formulation, for example, either the solvent method of casting of films or the hot roll method for preparing a plastic mass for use in molding sheets and other objects.

The proportions of plasticizer employed in the composition of the present invention may be varied over a wide range in accordance with the established practice in preparing cellulose ester and cellulose nitrate plastic compositions. The range generally employed is that of 15 to 50 parts of plasticizer per 100 parts of cellulose derivative. The proportions of α-phenyl-2-ethylcyclohexanol or α-cyclohexyl-2-ethylcyclohexanol employed in the composition may be varied from 1 part per 100 parts of the cellulose derivative to the limit of compatibility of these compounds in the cellulose-plasticizer composition. The amount of these stabilizers employed may be considered as replacing part of the plasticizer, for example using 45 parts of plasticizer and 5 parts of α-phenyl-2-ethylcyclohexanol or α-cyclohexyl-2-ethylcyclohexanol per 100 parts of cellulose derivative in place of 50 parts of plasticizer. As an alternative, the amount of stabilizer employed may be in addition to the amount of plasticizer normally employed, as for example with 50 parts of plasticizer and 10 parts of α-phenyl-2-ethylcyclohexanol or α-cyclohexyl-2-ethylcyclohexanol per 100 parts of cellulose derivative.

I have found that the desired range of concentration of α-phenyl-2-ethylcyclohexanol or α-cyclohexyl-2-ethylcyclohexanol for the accomplishment of the purposes of the present invention is that of 1 to 5 parts per 100 parts of cellulose derivative. The compatibility limit of these stabilizers in the compositions of the present invention varies over a wide range and depends upon the properties of the cellulose ester or cellulose nitrate and of the plasticizer selected therefor. It is impossible to set forth a fixed upper limit of compatibility of these stabilizers for the purposes of the present invention because of the variety of plasticizers and the variety of cellulose derivatives to which α-phenyl-2-ethylcyclohexanol or α-cyclohexyl-2-ethylcyclohexanol may be applied for the accomplishment of the purposes of the present invention is very extensive and the proportions of cellulose derivative to plasticizer give rise to further wide variations in properties with the net result that the amount of these stabilizers which may be incorporated in the plastic composition without exceeding the compatibility limit and with a view toward attaining a specific set of characteristics or properties in the resulting plastic composition varies with the particular composition prepared. I have found, however, that as little as one part of α-phenyl-2-ethylcyclohexanol or α-cyclohexyl-2-ethylcyclohexanol per 100 parts of cellulose derivative in the plastic composition gives rise to unexpected and highly desirable properties of light resistance and weather resistance of an order superior in many respects to that obtained with the use of one part of previously known and used light screening agents such as phenyl salicylate. One to 15 parts of α-phenyl-2-ethylcyclohexanol or α-cyclohexyl-2-ethylcyclohexanol per 100 parts of cellulose derivative may be utilized in cellulose nitrate and cellulose ester plastic compositions regardless of the type or amount of plasticizer employed. For most instances, the use of 1 to 5 parts of these stabilizers is satisfactory.

The stabilizers utilized in the novel compositions of this invention are described and claimed in my co-pending application, Serial No. 122,599, filed October 20, 1949. This may be represented by the formula

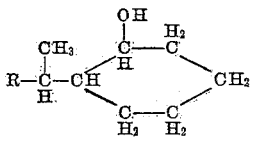

wherein R represents a phenyl or cyclohexyl radical. A typical method of preparation of these materials is as follows:

600 parts by weight of α-phenyl-2-ethylphenol and 35 parts by weight of finely divided nickel are charged to an autoclave. With continuous agitation the mixture is heated to about 140° C. and gaseous hydrogen introduced at a pressure of about 900 pounds per square inch. Hydrogenation is continued while slowly increasing the temperature. Hydrogenation is stopped when absorption of hydrogen ceases at a temperature of about 245° C.

The reaction mixture is then filtered to remove the catalyst. The filtrate is fractionated under an absolute temperature of 20 mm. Hg, recovering a fraction of α-cyclohexyl-2-ethylcyclohexanol at a vapor temperature of 172°–178° C. and a fraction of α-phenyl-2-ethylcyclohexanol at a vapor temperature of 178°–183.5° C.

The following are specific examples illustrating the utility of the new products of the present invention. All parts are by weight.

*Example I*

Plastic compositions comprising 100 parts of cellulose nitrate, RS ½ sec., 20 parts of dibutyl phthalate and amounts of α-phenyl-2-ethylcyclohexanol ranging from substantially 1 part to substantially 15 parts were dissolved in a sufficient quantity of a solvent comprising equal volumes of toluene and butyl acetate to form individual solutions containing substantially 10% of said plastic compositions. Plastic compositions comprising 100 parts of cellulose nitrate, RS ½ sec., 20 parts of dibutyl phthlate and amounts of α-cyclohexyl-2-ethylcyclohexanol, ranging from substantially 1 part to substantially 15 parts were dissolved in a sufficient quantity of solvent comprising equal volumes of toluene and butyl acetate to form individual solutions containing substantially 10% of said plastic compositions. Other plastic compositions comprising 100 parts of cellulose nitrate, RS ½ sec., 20 parts of dibutyl phthalate and amounts of phenyl salicylate ranging from substantially 1 part to substantially 15 parts were dissolved in a sufficient quantity of a solvent comprising equal volumes of toluene and butyl acetate to form individual solutions containing substantially 10% of the plastic composition.

The above described solutions were applied to opal-glass panels and the resulting films were allowed to dry for 48 hours at room temperature. Thereafter these films were exposed for approximately 100 hours to the rays in a National X–1A weathering unit, using sunshine carbons and Corex "D" filters in the absence of a water spray. An examination showed that the compositions containing α-phenyl-2-ethylcyclohexanol or α-cyclohexyl-2-ethylcyclohexanol possessed substantially less coloration due to ultra-violet light and weathering than the corresponding compositions containing similar proportions of phenyl salicylate. Moreover, the exposed films containing α-phenyl-2-ethylcyclohexanol or α-cyclohexyl-2-ethylcyclohexanol exhibited an increasing resistance to the effects of light with increased stabilizer content up to approximately 5%, and thereafter the improvement in light-resistance appeared to level off, indicating that for the purpose of the composition prepared, amounts of α-phenyl-2-ethylcyclohexanol or α-cyclohexyl-2-ethylcyclohexanol above 5% were in excess of that required to provide light stability to the particular plastic composition prepared in this instance. In other tests, it was found that the amount of stabilizer required for light stability of the composition varied to some extent with the proportions of plasticizer employed in the composition. The greatest amount of α-phenyl-2-ethylcyclohexanol or α-cyclohexyl-2-ethylcyclohexanol required for light stability, however, was found when the type of plasticizer was varied. For example, plastic compositions comprising 100 parts cellulose nitrate, RS ½ sec., 20 parts of tricresyl phosphate and amounts of α-phenyl-2-ethylcyclohexanol or α-cyclohexyl-2-ethylcyclohexanol ranging from substantially 1 part to substantially 25 parts were prepared according to the method described herein above, and were exposed according to the procedure described to the weathering unit. It was found that those compositions containing in excess of 5% of the stabilizer possessed superior light-resistance and weathering characteristics, although a marked degree of light-resistance was provided even in those compositions containing as little as 1% of the stabilizer.

*Example II*

Plastic compositions comprising 100 parts of cellulose nitrate, 20 parts of dibutyl phthalate and amounts of α-phenyl-2-ethylcyclohexanol ranging from substantially 1 part to substantially 15 parts were blended on hot rolls in the presence of sufficient acetone to facilitate the working of the components on the rolls at a temperature of 80–110° C. Plastic compositions comprising 100 parts of cellulose nitrate, 20 parts of dibutyl phthalate and amounts of α-cyclohexyl-2-ethylcyclohexanol ranging from substantially 1 part to substantially 15 parts were blended on hot rolls in the presence of sufficient acetone to facilitate the working of the components on the rolls at a temperature of 80–110° C. The plastic mass was worked on the rolls until the components of the mass were thoroughly blended. Thereafter, the mass was removed from the rolls and molded into the form of a sheet in a hydraulic press at a temperature of 100–120° C. The sheets thus obtained were exposed for approximately 100 hours in the weathering unit described in Example I and were thereafter compared first with similar compositions containing 20% of dibutyl phthalate and no light screening agent, and also with similar compositions containing 20 parts of dibutyl phthlate and amounts of phenyl salicylate, ranging from substantially 1 part to substantially 15 parts. The composition indicated a very substantial improvement in light-resistance in the plastic sheets containing α-phenyl-2-ethylcyclohexanol or α-cyclohexyl-2-ethylcyclohexanol over those containing phenyl salicyciate in the same amount. The cellulose nitrate sheets containing no light screening agent were very strongly darkened by exposure in the weathering unit.

Example III

Plastic compositions comprising 100 parts of cellulose acetate, 45 parts of diethyl phthalate and amounts of α-phenyl-2-ethylcyclohexanol ranging from substantially 1 part to substantially 15 parts were dissolved in a sufficient quantity of acetone to form individual solutions containing substantially 10% of said plastic composition. Other plastic compositions comprising 100 parts of cellulose acetate, 45 parts of diethyl phthalate and amounts of α-cyclohexyl-2-ethylcyclohexanol ranging from substantially 1 part to substantially 15 parts were dissolved in a sufficient quantity of acetone to form individual solutions containing substantially 10% of said plastic composition. The above described solutions were applied to opal-glass panels and the resulting films were allowed to dry 48 hours at room temperature. Thereafter, these films were exposed approximately 100 hours in a National X–1A weathering unit using sunshine carbons and Corex "D" filters in the absence of a water spray. The colors of the exposed films were compared with the colors of similarly exposed films prepared from compositions containing similar proportions of phenyl salicylate in place of the α-phenyl-2-ethylcyclohexanol or α-cyclohexyl-2-ethylcyclohexanol. An examination showed that the films of the composition containing α-phenyl-2-ethylcyclohexanol or α-cyclohexyl-2-ethylcyclohexanol in each instance possessed less color than those containing comparable proportions of phenyl salicylate, and furthermore, the exposed film containing α-phenyl-2-ethylcyclohexanol or α-cyclohexyl-2-ethylcyclohexanol exhibited an increased resistance to the effects of light with increasing amounts of the stabilizer contained in the compositions. In contrast to the above results, a similarly prepared film containing 100 parts of cellulose acetate and 50 parts of diethyl phthalate, after an exposure identical with that described above, possessed very strong coloration and was very unstable to ultra-violet light.

Example IV

Films similar to those described in Example III, but containing in place of diethyl phthalate a similar quantity of triphenyl phosphate, were prepared according to the procedure described in Example III and were exposed in the weathering unit. The films containing α-phenyl-2-ethylcyclohexanol or α-cyclohexyl-2-ethylcyclohexanol were found to possess superior resistance to the effects of light.

Example V

Plastic compositions comprising 100 parts of cellulose acetate-butyrate, 15 parts of dibutyl sebacate and amounts of α-phenyl-2-ethylcyclohexanol ranging from substantially 1 part to substantially 15 parts were dissolved in a sufficient quantity of acetone to form individual solutions containing substantially 10% of said plastic compositions. Other plastic compositions comprising 100 parts of cellulose acetate-butyrate, 15 parts of dibutyl sebacate and amounts of α-cyclohexyl-2-ethylcyclohexanol ranging from substantially 1 part to substantially 15 parts were dissolved in a sufficient quantity of acetone to form individual solutions containing substantially 10% of said plastic compositions. The above described solutions were applied to glass panels and the resulting films were allowed to dry for 48 hours at room temperature. Thereafter, the films were exposed for approximately 100 hours in the weathering unit described in Example I. The films containing substantially 1 part of α-phenyl-2-ethylcyclohexanol or α-cyclohexyl-2-ethylcyclohexanol per 100 parts of cellulose acetate-butyrate possessed only a very faint color and the films containing in excess of 1 part of these stabilizers possessed substantially no color after the weathering period. Similar films containing in place of these stabilizers comparable amounts of phenyl salicylate were found upon exposure in the weathering unit to possess substantially more color than those containing α-phenyl-2-ethylcyclohexanol or α-cyclohexyl-2-ethylcyclohexanol.

Example VI

Films similar to those described in Example V were prepared using 15 parts of triphenyl phosphate in place of the dibutyl sebacate. The resulting films after exposure in the weathering unit were found to be superior in light resistance to similar films containing phenyl salicylate in place of α-phenyl-2-ethylcyclohexanol or α-cyclohexyl-2-ethylcyclohexanol.

The hereinbefore described specific examples are solely illustrative of the unforeseen and valuable products of the present invention. Examples I, III, IV, V and VI illustrate the effectiveness of these new compositions for coating and impregnating solutions and the like. However, as is evident to those skilled in the art, there are other uses for the compositions comprising a cellulose ester or a cellulose nitrate, a plasticizer, and α-phenyl-2-ethylcyclohexanol or α-cyclohexyl-2-ethylcyclohexanol, for example, for molding compositions. Furthermore, the scope of the present invention comprises these new compositions, whether employed alone or in admixture with other materials. This invention is limited solely by the claims attached hereto.

What is claimed is:

1. A composition of matter comprising a cellulose derivative selected from the group consisting of cellulose esters of lower fatty acids and cellulose nitrate, a plasticizer for said cellulose derivative and a compound selected from the group consisting of α-phenyl-2-ethylcyclohexanol and α-cyclohexyl-2-ethylcyclohexanol as a stabilizer for the cellulose ester in stabilizing amounts.

2. A composition of matter comprising a cellulose derivative selected from the group consisting of cellulose esters of lower fatty acids and cellulose nitrate, a plasticizer for said cellulose derivative and from 1 to 15 parts of a compound selected from the group consisting of α-phenyl-2-ethylcyclohexanol and α-cyclohexyl-2-ethylcyclohexanol per 100 parts of said cellulose derivative as a stabilizer for the cellulose ester.

3. A composition of matter comprising a cellulose derivative selected from the group consisting of cellulose esters of lower fatty acids and cellulose nitrate, a plasticizer for said cellulose derivative and from 1 to 5 parts of a compound selected from the group consisting of α-phenyl-2-ethylcyclohexanol and α-cyclohexyl-2-ethylcyclohexanol per 100 parts of said cellulose derivative as a stabilizer for the cellulose ester.

4. A composition of matter comprising a cellulose derivative selected from the group consisting of cellulose esters of lower fatty acids and cellulose nitrate, a plasticizer for said cellulose derivative and α-phenyl-2-ethylcyclohexanol as a stabilizer for the cellulose ester in stabilizing amounts.

5. A composition of matter comprising a cellulose derivative selected from the group consisting of cellulose esters of lower fatty acids and cellulose nitrate, a plasticizer for said cellulose derivative and 1 to 15 parts of α-phenyl-2-ethylcyclohexanol per 100 parts of said cellulose derivative as a stabilizer for the cellulose ester.

6. A composition of matter comprising cellulose nitrate, a plasticizer for said cellulose nitrate and from 1 to 15 parts of α-phenyl-2-ethylcyclohexanol per 100 parts of cellulose nitrate as a stabilizer for the cellulose ester.

7. A composition of matter comprising cellulose acetate, a plasticizer for said cellulose acetate and from 1 to 15 parts of α-phenyl-2-ethylcyclohexanol per 100 parts of cellulose acetate as a stabilizer for the cellulose ester.

8. A composition of matter comprising a cellulose derivative selected from the group consisting of cellulose esters of lower fatty acids and cellulose nitrate, a plasticizer for said cellulose derivative and α-cyclohexyl-2-ethylcyclohexanol as a stabilizer for the cellulose ester in stabilizing amounts.

9. A composition of matter comprising a cellulose derivative selected from the group consisting of cellulose esters of lower fatty acids and cellulose nitrate, a plasticizer for said cellulose derivative and 1 to 15 parts of α-cyclohexyl-2-ethylcyclohexanol per 100 parts of said cellulose derivative as a stabilizer for the cellulose ester.

10. A composition of matter comprising a cellulose derivative selected from the group consisting of cellulose esters of lower fatty acids and cellulose nitrate, a plasticizer for said cellulose derivative and 1 to 5 parts of α-cyclohexyl-2-ethylcyclohexanol per 100 parts of said cellulose derivative as a stabilizer for the cellulose ester.

JOHN KENNETH CRAVER.

References Cited in the file of this patent

UNITED STATES PATENTS

| Number | Name | Date |
|---|---|---|
| 1,841,312 | Carroll | Jan. 12, 1932 |
| 2,118,954 | Thomas | May 31, 1938 |
| 2,433,008 | Whitaker et al. | Dec. 23, 1947 |

FOREIGN PATENTS

| Number | Country | Date |
|---|---|---|
| 315,279 | Great Britain | Nov. 10, 1930 |
| 397,883 | Great Britain | Sept. 1, 1933 |
| 477,036 | Great Britain | Dec. 20, 1937 |

OTHER REFERENCES

Barhan et al.: "Jour. Chem. Soc.," London, 1932, pages 2520, 2521 and 2523.